(12) United States Patent
Leighton et al.

(10) Patent No.: US 7,296,082 B2
(45) Date of Patent: Nov. 13, 2007

(54) METHOD AND SYSTEM FOR FAULT TOLERANT MEDIA STREAMING OVER THE INTERNET

(75) Inventors: F. Thomson Leighton, Newtonville, MA (US); Daniel M. Lewin, Cambridge, MA (US); David Shaw, Cambridge, MA (US); Bruce Maggs, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 10/457,266

(22) Filed: Jun. 9, 2003

(65) Prior Publication Data

US 2003/0200326 A1 Oct. 23, 2003

Related U.S. Application Data

(62) Division of application No. 09/478,571, filed on Jan. 6, 2000, now Pat. No. 6,665,726.

(51) Int. Cl.
*G06F 15/16* (2006.01)
(52) U.S. Cl. .................................................. 709/231
(58) Field of Classification Search ........ 709/204–205, 709/219, 231, 213–216; 714/2; 725/87, 725/95–99
See application file for complete search history.

(56) References Cited

U.S. PATENT DOCUMENTS 5,623,483 A 4/1997 Agrawal et al.

(Continued)

FOREIGN PATENT DOCUMENTS

DE 195 09 602 C1 3/1995

(Continued)

OTHER PUBLICATIONS

Hamdaoui, M., et al., A Dynamic Multiple Copy Approach for Time-Constrained Communication in a Virtual Cut-through Environment, citeseer.nj.nec.com/179168.html, pp. 1-29, Feb. 1994.*

(Continued)

*Primary Examiner*—Larry D. Donaghue
(74) *Attorney, Agent, or Firm*—David H. Judson (57) ABSTRACT

A replication process to provide fault tolerance for a streaming signal in a computer network. In one embodiment, the original or source signal is sent to several splitters which, in turn, each make copies of the signal and send the copies into a second layer of devices, which are referred to as "concentrators." A given concentrator receives as input one or more copies of the source signal. In a preferred embodiment, a given concentrator receives two copies of the source signal from at least two different splitters. The concentrators process the incoming streaming signal copies, for example, by merging them into a single or composite copy of the original source signal according to a given processing algorithm. The output of a given concentrator may then be fed into a splitter, with the process then being repeated if desired to make an arbitrary large number of copies of the signal. At the end of the replication process, the output of a splitter or a concentrator is fed directly or indirectly to an end user. The replication process is fault-tolerant, and thus the end user's signal is not interrupted regardless of signal or equipment problems within the distribution mechanism.

6 Claims, 4 Drawing Sheets

U.S. PATENT DOCUMENTS

| | | | |
|---|---|---|---|
| 5,627,822 A | | 5/1997 | Edmaier et al. |
| 5,627,825 A | | 5/1997 | Barraclough et al. |
| 5,778,187 A | | 7/1998 | Monteiro et al. |
| 5,805,785 A | | 9/1998 | Dias et al. |
| 5,831,975 A | * | 11/1998 | Chen et al. ......... 370/256 |
| 5,854,898 A | | 12/1998 | Riddle |
| 5,928,331 A | | 7/1999 | Bushmitch |
| 5,946,294 A | | 8/1999 | Stein |
| 5,996,001 A | | 11/1999 | Quarles et al. |
| 6,032,189 A | | 2/2000 | Jinzenji et al. |
| 6,195,680 B1 | | 2/2001 | Goldszmidt et al. |
| 6,263,371 B1 | * | 7/2001 | Geagan et al. ......... 709/231 |
| 6,339,785 B1 | | 1/2002 | Feigenbaum |
| 6,415,323 B1 | | 7/2002 | McCanne et al. |
| 6,418,142 B1 | | 7/2002 | Wolf |
| 6,466,574 B1 | * | 10/2002 | Fujisaki et al. ......... 370/356 |
| 6,496,477 B1 | * | 12/2002 | Perkins et al. ......... 370/228 |
| 6,505,240 B1 | | 1/2003 | Blumenau |
| 6,529,475 B1 | * | 3/2003 | Wan et al. ......... 370/231 |
| 6,594,798 B1 | * | 7/2003 | Chou et al. ......... 714/820 |
| 6,697,365 B1 | * | 2/2004 | Messenger ......... 370/390 |

FOREIGN PATENT DOCUMENTS

| | | |
|---|---|---|
| EP | 0 566 241 A2 | 3/1993 |
| EP | 0963082 A2 * | 8/1999 |

OTHER PUBLICATIONS

Orda, A., et al., Routing with Packet Duplication and Elimination in Computer Networks, IEEE Trans. on Communications, vol. 36, No. 7, pp. 860-866, Jul. 1988.*

RealProxy G2 Administration Guide, Beta One, Real Networks, Inc., www.ecsl.cssunysb.edu/~chiueh/ese646/cn8/cn8.html, pp. 1-124, 1999.*

CacheFlow Internet Caching Appliances: Next Generation Proxy Server Solution, CacheFlow, Inc., pp. 1-12, Oct. 1999.

Streaming Media Optimiation with CacheFlow Internet Caching Appliances, CacheFlow, Inc., pp. 1-12, Oct. 1999.

RealProxy G2 Administration Guide, Beta One, RealNetworks, Inc., ns3, yar.ru/doc/realproxyg2b1.pdf, pp. 1-124, 1999.

Yan, Xifeng, Course Notes for CSE-646, Content Distribution Network, www.ecsl.cssunysb.edu/~chiueh/cse646/cn8/cn8.html, pp. 1-9, Nov. 2000.

* cited by examiner

METHOD AND SYSTEM FOR FAULT TOLERANT MEDIA STREAMING OVER THE INTERNET

CROSS-REFERENCE TO RELATED APPLICATION

This application is a divisional of prior application Ser. No. 09/478,571, filed Jan. 6, 2000 and now U.S. Pat. No. 6,665,726, issued Dec. 16, 2003.

BACKGROUND OF THE INVENTION

1. Technical Field

The present invention relates generally to digital signal transmission over a computer network and, in particular, to a method and system for streaming content over the Internet in a fault tolerant manner.

2. Description of the Related Art

Most Internet users do not have fast enough access to the Internet to download large multimedia files quickly. Streaming is a technique for delivering web-based video, audio and multimedia files so that these files can be processed as a steady and continuous stream at the requesting client, typically using a browser plug-in, such as Microsoft NetPlayer, Apple QuickTime, Real Networks RealSystem G2, or the like. Streaming video, for example, is an online video distribution mechanism that provides audio and video to Internet users, without the users having to wait while content completely downloads to their hard drives. Through caching, content is played as it is received, and buffering mechanisms ensure that content is played smoothly. Theoretically, streaming video plays to the end user, or viewer, as an immediate and ongoing broadcast.

From a network perspective, traditional approaches to streaming Internet content involve transmitting a streaming signal from a source to a device known as a splitter (or repeater, reflector or mirror), which, in turn, replicates the source signal into multiple signals. Each of the multiple signals is the same, and each is sent on to a different destination. By cascading splitters in a tree-like fashion, a single source stream can be replicated into thousands or more identical copies. In this manner, a large number of viewers on the Internet can receive the same streaming signal simultaneously.

Figures 1, 3, 4:
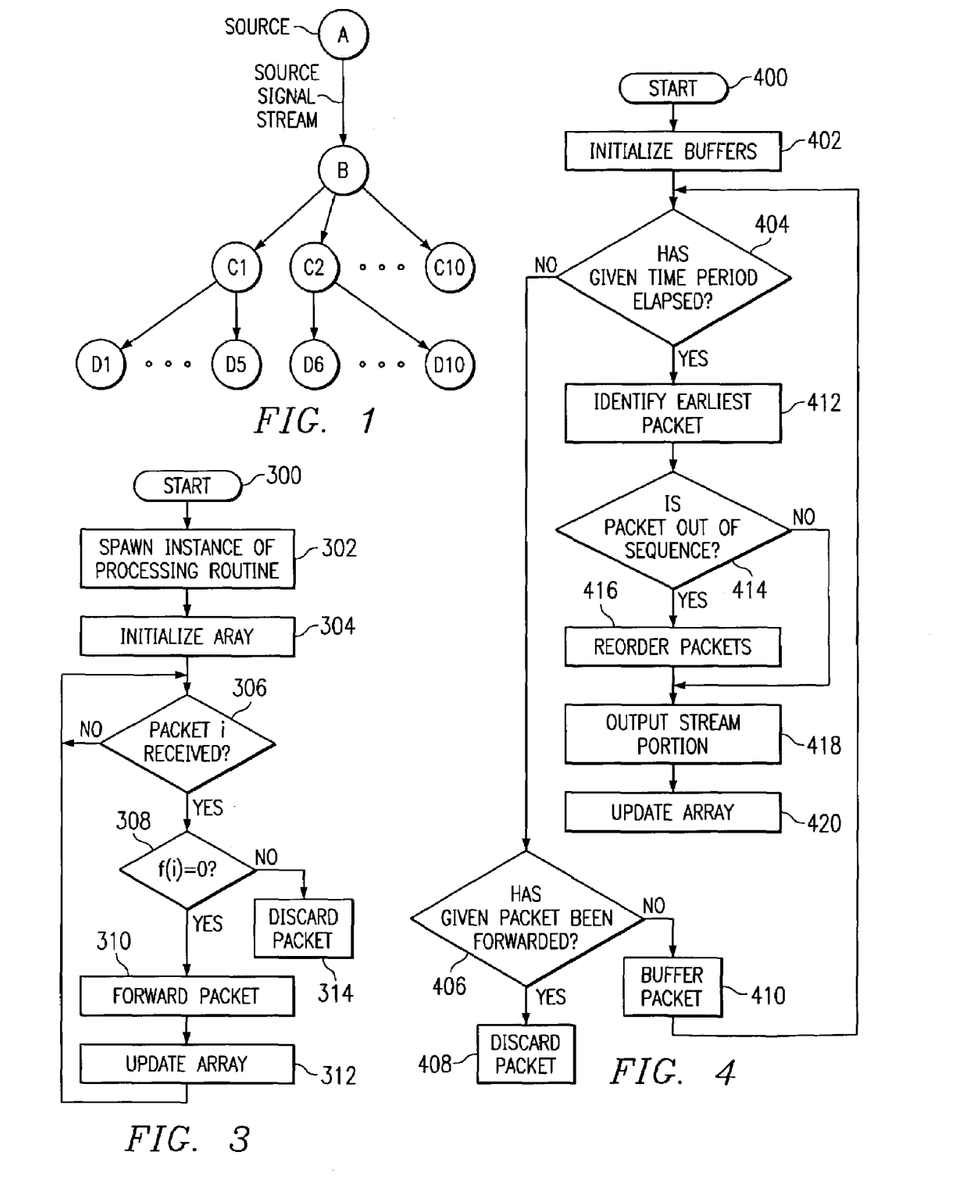
FIG. 1 is a simplified diagram of a known streaming architecture in which a plurality of splitters are used to transmit the source signal to a plurality of end users or viewers.
FIG. 3 is a flowchart of a first type of processing routine that may be used in a concentrator.
FIG. 4 is a flowchart of a second type of processing routine that may be used in a concentrator.

A critical problem with existing streaming methods of this type is that they are not fault tolerant. FIG. 1 illustrates why this is the case. In this example, a source signal (A) is sent to a splitter (B), which then sends copies of the signal to ten splitters (C1, . . . , C10). Each of the second level splitters then sends a copy of the signal to five end customers (D1, . . . , D50). Thus, for example, splitter C1 sends a copy to end users D1-D5, splitter C2 sends a copy to end users D6-D10, and so forth. If communications at a given splitter fail, however, certain users are unable to receive the original signal. In the network of FIG. 1, this would be the case with respect to users D6-D10 if C2 fails. To overcome this problem, it is also known in the art to enable end users to detect they are no longer receiving the streaming signal and to enable such users to attempt to contact an alternative splitter (e.g., C3) in an effort to get another copy of the signal. Such approaches, however, can result in an interruption of the signal and are expensive to implement.

Thus, there remains a need in the art to provide improved streaming techniques that are fault tolerant. The present invention solves this important problem.

BRIEF SUMMARY OF THE INVENTION

The present invention provides a replication process to provide fault tolerance for a streaming signal in a computer network. In one embodiment, the original or source signal is sent to several splitters which, in turn, each make copies of the signal and send the copies into a second layer of devices, which are referred to as "concentrators." A given concentrator receives as input one or more copies of the source signal. In a preferred embodiment, a given concentrator receives two copies of the source signal from at least two different splitters. The concentrators process the incoming streaming signal copies, for example, by merging them into a single or composite copy of the original source signal according to a given processing algorithm. Thus, preferably a given concentrator receives streams from multiple sources, removes duplicate packets, and then outputs a single stream. The output of a given concentrator may then be fed into a splitter, with the process then being repeated if desired to make an arbitrary large number of copies of the signal. At the end of the replication process, the output of a splitter or a concentrator is fed directly or indirectly to an end user. The replication process is fault-tolerant, and thus the end user's signal is not interrupted regardless of signal or equipment problems within the distribution mechanism.

One type of processing algorithm that is implemented at a concentrator simply transmits the first copy of each packet in the signal stream. Copies of packets that have already been transmitted are simply discarded. This algorithm may be implemented by maintaining a data array f(i) that has a first value (e.g., "1") if packet i in the stream has been forwarded and f(i) that has a second value (e.g., "0") otherwise. When a copy of packet i is received from one of the incoming streams, it is forwarded if and only if f(i) equals the second value. This technique is advantageous because a complete stream can be reconstructed from two or more partial streams. Thus, as long as the incoming copies of the stream collectively contain all the packets of the original stream, the concentrator produces a copy of the original stream.

Another type of processing algorithm that may be implemented at a concentrator uses a buffering technique. In this approach, a buffer of a given size is kept for each input stream to create an n-dimensional array, where n is the number of input streams. At a given cycle rate, the concentrator transmits a smallest index packet (namely, a packet that is earliest in the stream sequence) contained in any of the stream buffers. As each packet is transmitted, the data in the array is updated so that future copies of the same packet can be discarded. This protocol enables the concentrator to reorder the packets in a stream so that they are output in a correct order.

One or more concentrators as described above enable fault tolerant media streaming over a computer network such as the Internet, an intranet, a virtual private network, or the like.

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Streaming media is a type of Internet content that has the important characteristic of being able to play back while still in the process of being downloaded. A client can play the first packet of the stream, decompress the second, while receiving the third. Thus, the user can start enjoying the multimedia without waiting to the end of transmission. Streaming is very useful for delivering media because media files tend to be large, particularly as the duration of the programming increases. To view a media file that is not streamed, users must first download the file to a local hard disk—which may take minutes or even hours—and then open the file with player software that is compatible with the file format. To view streaming media, the user's browser opens player software, which buffers the file for a few seconds and then plays the file while simultaneously downloading it. Unlike software downloads, streaming media files are not stored locally on users' hard disks. Once the bits representing content are used, the player discards them.

Streaming media quality varies widely according to the type of media being delivered, the speed of the user's Internet connection, network conditions, the bit rate at which the content is encoded, and the format used. These last two concepts are explained in more detail below. In general, streaming audio can be FM quality, but streaming video is poor by TV standards, with smaller screens, lower resolution, and fewer frames per second. The source for streaming media can be just about any form of media, including VHS or Beta tapes, audio cassettes, DAT, MPEG video, MP3 audio, AVI, and the like. Prior to streaming the content, the content must first be encoded, a process which accomplishes four things: conversion of the content from analog to digital form, if necessary; creation of a file in the format recognized by the streaming media server and player; compression of the file to maximize the richness of the content that can be delivered in real-time given limited bandwidth; and, establishing the bit rate at which the media is to be delivered. Streaming media uses lossy compression, which means that after decompression on the client end, some portions of the content are not retained. For example, compression may reduce a VHS video clip with 30 frames per second to just 15 fps. Typically, media must be encoded at a specific bit rate, such as 28 kbps, 56 kbps, 100 kbps, or the like. Content owners typically choose to encode media at multiple rates, so that users with fast connections get as good an experience as possible, but users with slow connections can also access the content. Obviously, the lower the encoding rate, the more original content must be discarded when compressing.

Non-streaming content is standards-based in the sense that the server and client software developed by different vendors—Apache, Microsoft Internet Explorer, Netscape Communicator, and the like—generally work well together. Streaming media, however, usually relies on proprietary server and client software. The server, client, production and encoding tools developed by a streaming software vendor are collectively referred to as a format. Streaming media encoded in a particular format must be served by that format's media server and replayed by that format's client. Streaming media clients are often called players, and typically they exist as plug-ins to Web browsers. Streaming media clients are also often capable of playing standards-based non-streaming media files, such as WAV or AVI.

The three major streaming media formats in use today are: RealNetworks RealSystem G2, Microsoft Windows Media Technologies ("WMT"), and Apple QuickTime. RealSystem G2 handles all media types including audio, video, animation, still images and text, but it does not support HTML. RealSystem G2 supports SMIL, an XML-based language that allows the content provider to time and position media within the player window. To deliver the media in real time Real uses RTSP. To stream in WMT's Advanced Streaming Format, content providers must have Microsoft NT 4 Server installed. WMT does not support SMIL or RTSP but has its own protocol that it calls HTML+Time. Apple QuickTime recently has added the capability to serve streaming media. QuickTime can support a number of formats including VR, 3D, Flash, and MP3. QuickTime Streaming uses RTSP to deliver the movies in realtime, and a dedicated media server is required.

By way of further background, RTSP, the Real Time Streaming Protocol, is a client-server multimedia presentation protocol to enable controlled delivery of streamed multimedia data over IP network. It provides "VCR-style" remote control functionality for audio and video streams, like pause, fast forward, reverse, and absolute positioning. Sources of data include both live data feeds and stored clips. RTSP is an application-level protocol designed to work with lower-level protocols like RTP (Realtime Transport Protocol) and RSVP (Resource Reservation Protocol) to provide a complete streaming service over the Internet. It provides means for choosing delivery channels (such as UDP, multicast UDP and TCP), and delivery mechanisms based upon RTP. RTSP establishes and controls streams of continuous audio and video media between the media servers and the clients. In RTSP, each presentation and media stream is identified by an RTSP URL. The overall presentation and the properties of the media are defined in a presentation description file, which may include the encoding, language, RTSP URLs, destination address, port, and other parameters. The presentation description file can be obtained by the client using HTTP, email or other means. RTSP differs from HTTP for several reasons. First, while HTTP is a stateless protocol, an RTSP server has to maintain "session states" in order to correlate RTSP requests with a stream. Second, HTTP is basically an asymmetric protocol where the client issues requests and the server responds, but in RTSP both the media server and the client can issue requests. For example the server can issue a request to set playing back parameters of a stream.

The transport layer of non-streaming content uses the Transmission Control Protocol, or TCP. This is a connection-oriented protocol, which means a connection between server and client is established and maintained until the content has been completely received. One reason for the connection is that the client can report if any IP packets are not received, which are then retransmitted by the server. The result is that a file successfully transmitted over TCP, a logo for example, is always identical to its source—although the time required for transmission may vary widely depending on infrastructure.

By contrast, the transport layer for streaming media uses User Datagram Protocol, or UDP. UDP is a connectionless protocol, under which IP packets are sent from the server to the client without establishing a connection. This protocol enables streaming media's real-time nature: no need to wait to resend dropped packets. But it also means that the content quality may be degraded markedly between server and client, or that two different users may have a much different experience.

The present invention is designed to be used with any streaming media source, encoding scheme, media format, and streaming (or other transport) protocol.

Figure 2:
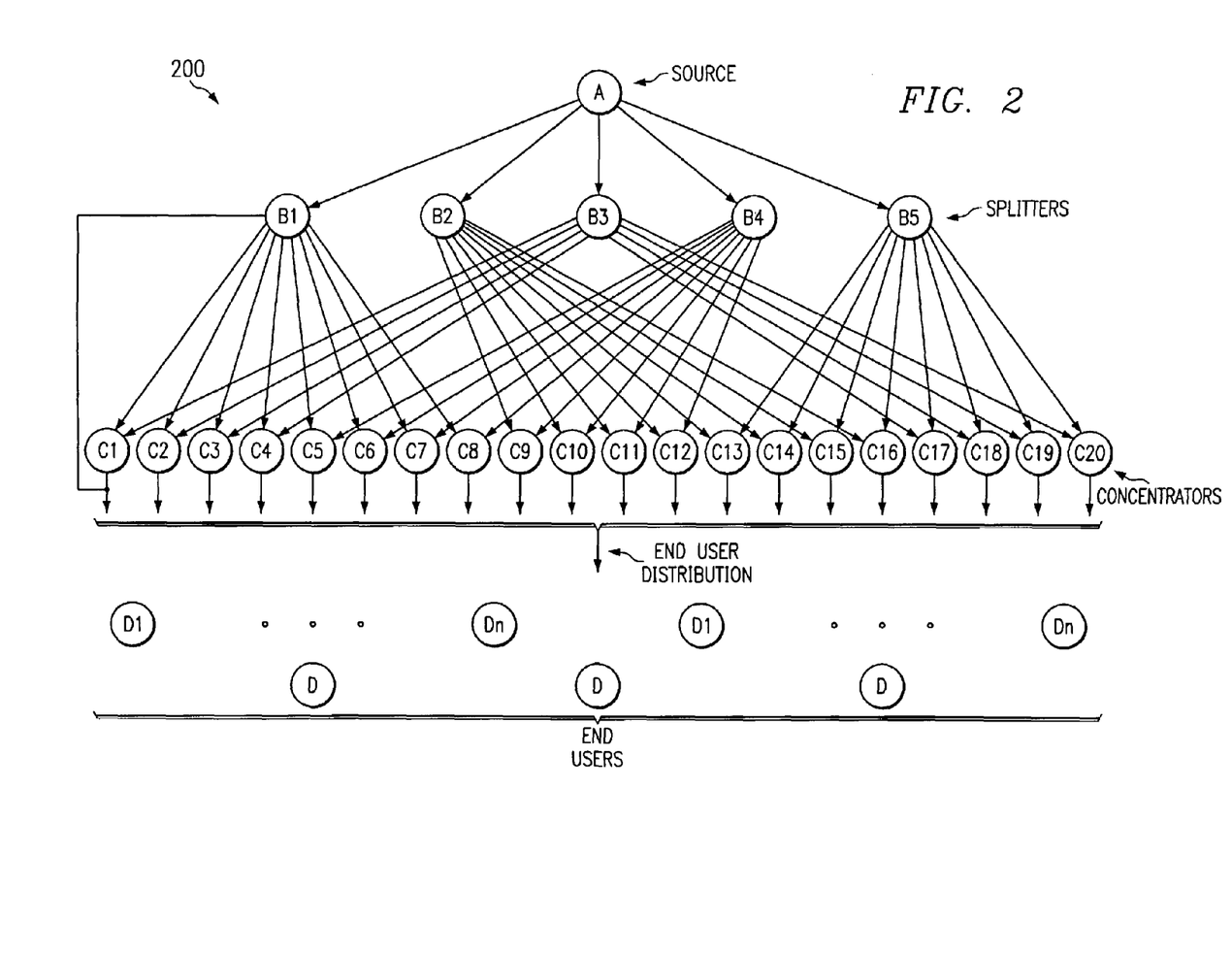
FIG. 2 is a simplified diagram illustrative the inventive use of concentrators according to the teachings of the present invention.

Referring now to FIG. 2, a packet-switched network 200 in which the present invention is implemented comprises a signal source A, a set of splitters B1-Bn, and a set of end users D1-Dn. According to the invention, the network also includes a set of so-called "concentrators" C1-Cn that facilitate an inventive signal replication process. This process ensures that each end user will always receive a copy of the source signal irrespective of interruptions in the transmission, e.g., due to equipment, device or communication failures, that occur within other elements of the distribution system.

Preferably, concentrators C are positioned within the network in a physical and/or logical layer located between the splitters B and the end users D. The physical configuration illustrated in FIG. 2, of course, is merely exemplary. An end user, of course, is typically a client computer that includes a browser or other graphics viewer having a plug-in or native support for streaming content. In a preferred embodiment, a concentrator C is a software program, namely, a set of computer instructions that comprise one or more processes, executable within a processor. As illustrated in FIG. 2, each concentrator C receives as input one or more copies of the source signal data stream. In a preferred embodiment of the invention, each concentrator C receives a copy of the source signal data stream from at least two (2) different splitters B. Thus, for example, in this embodiment, the original signal is sent to several splitters B1, ..., B5. These splitters make copies of the signal and send them to the concentrators C1, ..., C20. Splitter B1 sends a copy of the signal it received from source A to each of the concentrators C1, ..., C8. Splitter B2 sends a copy of the signal it received from source A to each of the concentrators C9, ..., C16. Splitter B3 sends a copy to concentrators C17, ..., C20 and C1, ..., C4, whereas B4 sends copies to C5, ..., C12, and B5 sends copies to C13, ..., C20. Again, these examples are not to be taken to limit the present invention in any way. In each case, however, it can be seen that every concentrator C receives a copy of the source signal data stream from precisely two splitters. Stated another way, each concentrator receives two streams, UDP1 and UDP2, representing copies of the original source stream.

Generally, the function of a concentrator it to process the incoming streams and to merge them into a single or composite copy of the source signal data stream that is then output from the concentrator. A concentrator removes duplicate packets and preferably outputs a single stream feed. This processing is quite advantageous. In particular, given several copies of a stream, even if they are all lossy, a single pristine stream can be generated from the remnants of the duplicate streams. The technique is very robust and can take a large number of failures before end user experience is impaired.

The processing of the data streams may be accomplished in a number of different ways. FIG. 3, for example, is a flowchart illustrating a first embodiment of the processing routine wherein the concentrator transmits only the first copy of each packet in the stream. Copies of packets that have already been transmitted are simply discarded. FIG. 4 illustrates a second embodiment of the processing routine wherein multiple copies of the streams are buffered to enable out-of-order packets to be reordered as the output is generated. Each of the embodiments will now be described in detail.

Referring now to FIG. 3, a first embodiment of the processing routine utilizes an array f(i) for the source signal. An element in the data array has a given first value, e.g., 1, if packet i in the stream has been forwarded from the concentrator and a second value, e.g., 0, otherwise. The routine begins at step 300. At step 302, an instance of the processing routine is spawned, typically when the first packet of the stream arrives at the concentrator. At step 304, the array is initialized. The processing routine then continues at step 306 to test whether a packet i has been received from one of the incoming streams. If not, the routine cycles. If, however, the outcome of the test at step 306 is positive, which indicates that the packet has been received, a test is performed at step 308 to determine whether f(i)=0. If so (because this is the first occurrence of the packet i), the routine continues at step 310 to forward the packet from the concentrator without delay. At step 312, the routine updates the array by setting the value of the packet i in the array equal to 0. Control then returns to step 306. If, however, the outcome of the test at step 308 indicates that f(i) is not equal to 0, then the routine continues at step 314 to discard the packet (since it has already been forwarded).

Thus, in effect, the processing routine parses packets as they arrive at the concentrator. If the parser has already seen the stream packet, the packet is discarded; otherwise, it is forwarded.

The processing routine of FIG. 3 is advantageous in that it is simple to implement and does not introduce any delay into the streams (which, for example, might be caused by waiting for a particular copy of a packet to arrive). This routine also has the desirable feature that a complete stream can be reconstructed from two or more partial streams. Thus, as long as the incoming copies of the stream collectively contain all the packets in the original stream, then the concentrator will produce a copy of the original stream.

As an example, and with reference to FIG. 2 again, if one of the splitters (e.g., B1) ceases to function, then each of concentrators C1, ... C4 will still receive the stream from splitter B3 and each of concentrators C5, ..., C8 will still receive the stream from splitter B4. There is never an interruption of the signal transmitted by any of the concentrators in this illustrative example. This property is preserved irrespective of which splitter is not functioning. Indeed, even if two splitters (e.g., B1 and B3) suffer packet loss, it is still possible for each of the concentrators C1, ... C4 to reconstruct the original signal using the process described above (provided that the packet loss is less than 50%).

Referring now to FIG. 4, an alternate embodiment is shown wherein each incoming stream at a concentrator has a buffer associated therewith. By buffering stream packets, the concentrator may reorder the packets in the stream before output. The routine begins at step 400. At step 402, the buffers are initialized. The routine then continues at step 404 to test whether a given cycle has elapsed. If not, the routine continues at step 406 (for each stream) to test whether a given incoming packet (for the stream) has already been forwarded. If the outcome of the test at step 406 is positive, the routine discards the packet at step 408. If the given incoming packet has not been forwarded, the packet is buffered at step 410. Control then returns to step 404. Using the buffering scheme, for example, packets from stream UDP1 are buffered in a first buffer, packets from stream UDP2 are buffered in a second buffer, and so on. When the outcome of the test at step 404 indicates that the given cycle has elapsed, control branches to step 412 to identify the packet that is the earliest in the stream sequence. At step 414, a test is performed to determine whether this packet is out of sequence. If so, the routine reorders the packets as necessary at step 416. The resulting stream is then output from the concentrator at step 418. At step 420, the array is updated to reflect the packets that have been forwarded. Step 418 is also reached if there is a negative outcome of the test at step 414.

Thus, in the routine of FIG. 4, a buffer of a given size is kept for each input stream copy. At each cycle, the concentrator transmits the smallest index packet contained in any of the buffers. As each packet is transmitted, the data in the array is updated so that future copies of the same packet can be discarded when they arrive at the concentrator. As can be seen, the protocol of FIG. 4 is similar to the routine of FIG. 3 except that it has the additional desired feature that it can reorder the packets in the stream so that they are output in the correct order. The larger the buffer size, the more likely it is that out-of-order packets can be output in order. In this way, packets that are slowed down in the network have the opportunity to catch up at the buffer.

Regardless of which technique (FIG. 3 or FIG. 4) is used at a given concentrator C, the output of a given concentrator can then be fed back to a splitter or to an end user directly. When the concentrator is output to a splitter, the process can be repeated to make an arbitrarily large number of copies of the source signal data stream. At the end of the replication process, the output of a splitter or concentrator (or some other device) is fed directly to a viewer. The resulting replication process is completely fault-tolerant. In particular, no matter what signal is destroyed, the end user's signal is not interrupted.

The number of signals input to each concentrator determines the number of faulty streams that can be tolerated by the distribution system. For example, if every concentrator receives the signal from at least k different splitters, then the system can tolerate faults in any subset of k-1 signals without compromising the signal received by any end user. If the faults in signals (or system components) are random, then the system can tolerate F faults before any end user's signal is interrupted, where F is about N $\{1-1/k\}$ and N is the number of components in the system. If the packet loss rate being experienced on each stream is p, then the loss rate, after concentration, is pk×the number of streams.

In a preferred embodiment, it is desirable to input two (2) input streams to a given concentrator. The cost of more streams, of course, is more network bandwidth for the distribution mechanism. Where multiple input streams are supplied to a concentrator (or output from a splitter), a variant of the present invention is to incorporate given coding schemes within the splitters/concentrators to recover some of the bandwidth used to transmit multiple data streams. In this variant, as a stream is output from a given device (e.g., a splitter), it is encoded using an encoding routine. As the stream enters the concentrator in the underlying layer, it is decoded and processed in the manner described above. When coding techniques are used, then the copies of the data stream output from the splitters need not be identical; rather, the copies may vary as a result of the encoding algorithm used within a given device.

In an illustrative embodiment, a useful encoding scheme is the Rabin Information Dispersal Algorithm. Information dispersal involves the breaking-up of packets into a collection of subpackets that are routed in a greedylike fashion to their common destination along edge-disjoint paths. The advantage of information dispersal is that the dispersal of large packets into many small subpackets tends to results in very balanced communication loads on the edges of a network. As a consequence, the maximum congestion in the network is likely to be very low, and there is a good chance that packets will never be delayed at all. In addition, if the contents of a packet are encoded into a collection of subpackets in a redundant fashion, an information dispersal algorithm becomes more fault tolerant as only a fraction of the subpackets have to reach the destination for the original packet to be reconstructed. Further information about the Information Dispersal Algorithm may be found in the following reference, Leighton, Introduction To Parallel Algorithms and Architectures: Arrays, Trees, Hybercubes, Morgan Kaufmann (1992), Section 3.4.8, which is incorporated herein by reference. Thus, in an illustrative embodiment, ,the Rabin Information Dispersal Algorithm is implemented within a given splitter and a given concentrator.

Figure 5:
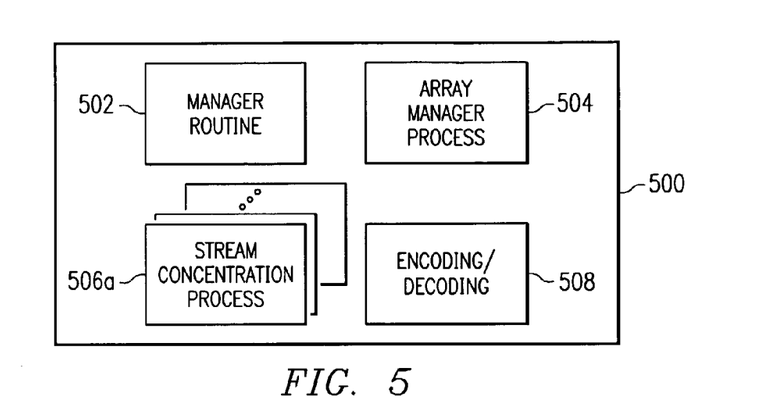
FIG. 5 is a block diagram of a concentrator used in the present invention.

As noted above, a concentrator for use in the present invention is a software program executable on a computer. FIG. 5 illustrates a representative concentrator 500 comprising a manager routine 502, an array manager process 504, and a set of stream concentration processes 506a-n. One or more coding/decoding routines 508 may be provided as described in the variant above. In operation, the manager routine 502 is initialized upon startup of the concentrator. As an input data stream is received, the manager routine 502 launches an instance of the stream concentration process 506, which manages the merging of the individual data streams into the stream that is then output from the concentrator. The array manager process is invoked by the manager routine 502 to establish an array (or other data structure or equivalent work area) for use by a given stream concentration process 506. By using multiple stream concentration processes, a given concentrator may be used to concentrate different content streams under the control of the manager routine.

Figure 6:
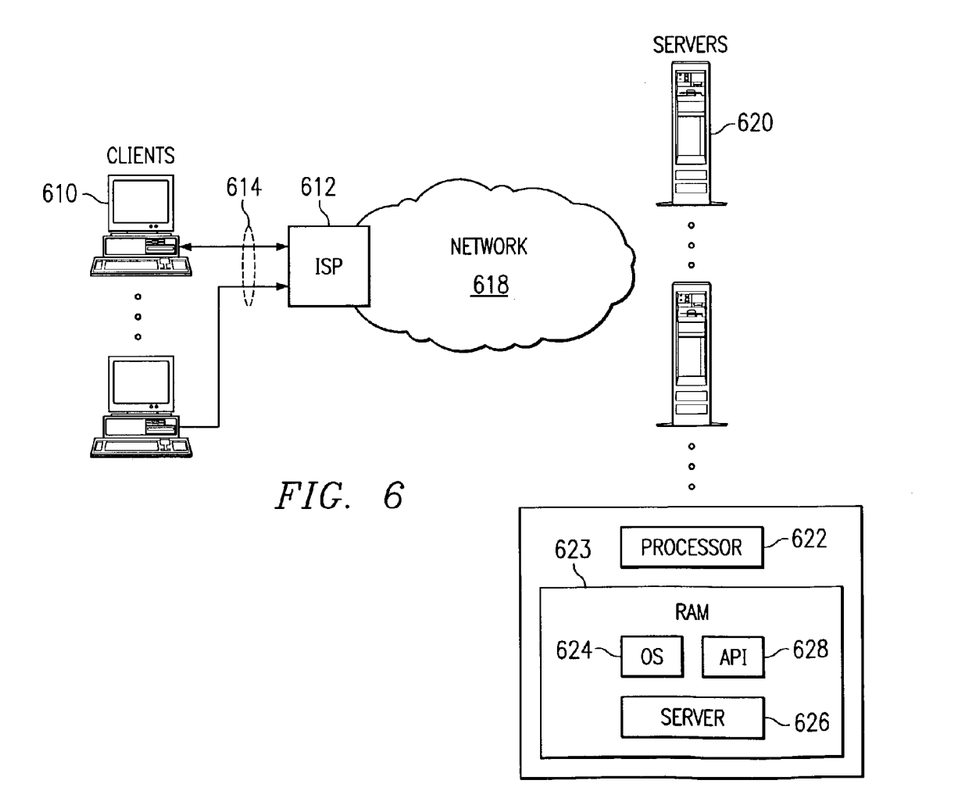
FIG. 6 is a block diagram of a client-server computing environment in which the present invention may be implemented.

The fault-tolerant distribution mechanism of the present invention may be implemented within a conventional client-server distributed computing environment. FIG. 6 illustrates a conventional client-server environment in which the streaming framework may be implemented. In this example, a plurality of Internet client machines 610 are connectable to a computer network service provider 612 via a network such as a telephone network 614. The service provider 612 interfaces the client machines 610 to the remainder of the network 618, which may include a plurality of web content server machines 620. Network 618 typically includes other servers (not shown) for control of domain name resolution, routing and other control functions. A client machine typically includes a suite of known Internet tools. Various known Internet protocols are used for these services.

A given client machine and the server may communicate over the public Internet, an intranet, or any other computer network. If desired, given communications may take place over a secure connection. Thus, for example, a client may communication with the server using a network security protocol, such as Netscape's Secure Socket Layer (SSL) protocol or the like.

A representative client is a personal computer, notebook computer, Internet appliance or pervasive computing device (e.g., a PDA or palm computer) that is x86-, Pentium-, PowerPC®- or RISC-based. The client includes an operating system such as Microsoft Windows '98, Microsoft NT, Windows CE or PalmOS. The client includes a suite of Internet tools including a Web browser, such as Netscape Navigator or Microsoft Internet Explorer, that has a Java Virtual Machine (JVM) and support for application plug-ins or helper applications.

A representative web server comprises a processor 622, an operating system 624 (e.g., Linux, Windows NT, Unix, or the like) and a web server program 626. OS 624 and web server program 626 are supported in system memory 623 (e.g., RAM). Of course, any convenient server platform (e.g., Apache, WebSphere, or the like) may be supported. The server may include an application programming interface 628 (API) that provides extensions to enable application developers to extend and/or customize the core functionality thereof through software programs including plug-ins, CGI programs, servlets, and the like.

A representative concentrator is a computer or computer platform having an operating system and support for network connectivity. Thus, for example, a representative concentrator comprises a computer running Windows NT (Intel and DEC Alpha), IBM AIX, HP-UX, Sun Solaris (SPARC and Intel Edition), Novell NetWare or Windows '98.

Figure 7:
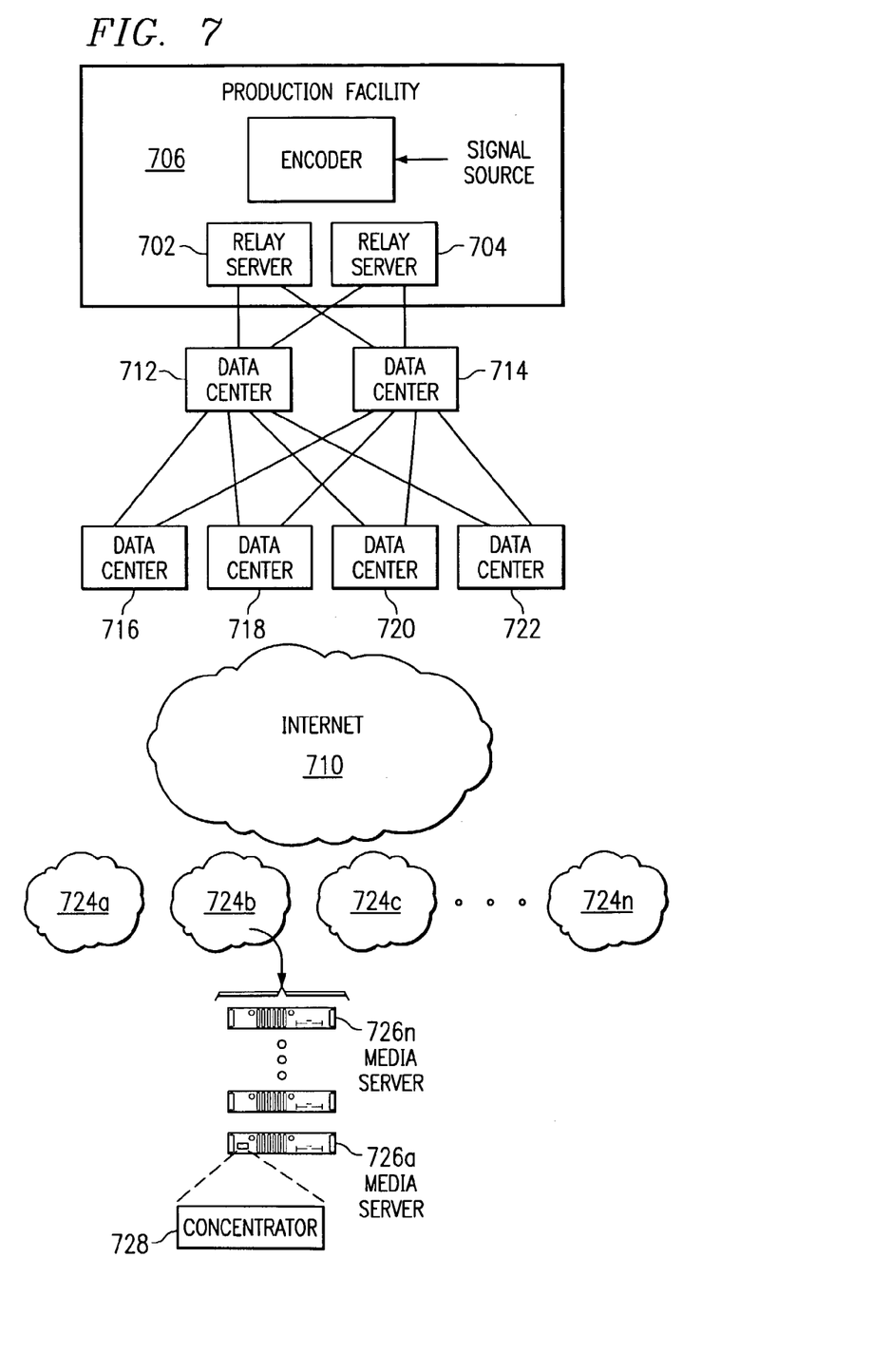
FIG. 7 is a block diagram illustrating an implementation of the present invention.

FIG. 7 illustrates an implementation of the present invention. The system 700 comprises a pair of relay servers 702 and 704 residing, for example, at a streaming video production facility 706. These servers are equipped, for example, with two (2) network cards each, one set of which are wired onto a common network with encoder machines 708, and the other set of which is connected to the Internet 710. The encoder machines 708 encode the video and audio data and send the encoded packets to a broadcast address of the network they share with the relay servers 702 and 704. The relay servers pick up the packets and re-send them out, for example, over two dedicated T-1 lines to two different data centers 712 and 714. From these two data centers, content fans out to two more data centers each 716, 718, 720 and 722, thus making four duplicates of each data packet. Each of the four data centers sends a copy of each packet to each of a set of regions 724a-n, with each server region 724 comprising a set of content hosting servers 726a-n. Each region includes a concentrator 728, which removes the duplicates and feeds the single remaining stream to each server 726 in that region. Although not meant to be limiting, the server regions may comprise part of a distributed content hosting system such as Akamai FreeFlow™, which is a high-performance, fault-tolerant web content delivery service.

As noted above, the invention may be implemented in software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by Letters Patent is set forth in the following claims.

What is claimed is:

1. A method of fault tolerant delivery of live media content, the content being available in a given media format as a stream of data packets, comprising:

receiving the stream at each of a set of splitter devices, wherein each splitter is located at a data center;

from each splitter device, outputting a copy of each packet in the stream to a set of remote server regions, with each server region including a concentrator device, and a set of media servers associated with the given media format;

at each server region, having the concentrator device reassemble the stream of data packets by receiving data packets output from each splitter device and discarding redundant packets, wherein a given data packet is processed within the concentrator device upon its receipt at the concentrator device and, if not discarded, is forwarded from the concentrator device upon such processing without delay;

feeding, as a stream of data packets, the data packets forwarded from the concentrator, wherein the stream of data packets is fed to each of the set of media servers associated with the given media format so that each of the set of media servers in the server region is available to provide the stream of data packets;

within each server region, at each of the media servers in the set of media servers, receiving the stream of data packets forwarded from the concentrator device; and in response to each end user request that is directed to one of the set of media servers in the server region that has received the stream of data packets forwarded from the concentrator device, outputting the stream of data packets from a given media server in a server region;

wherein data packets are delivered from each splitter to each server region via a non-streaming media protocol and the stream of data packets is output from the given media server over a given streaming protocol.

2. The method of fault tolerant delivery as described in claim 1 wherein the streaming protocol is RTSP.

3. The method of fault tolerant delivery as described in claim 1 wherein the non-streaming media protocol is UDP.

4. The method as described in claim 1 further including the steps of:

encoding the stream of data packets at a given point in the delivery of the stream; and decoding the encoded stream of data packets at a subsequent point in the delivery of the stream.

5. The method as described in claim 1 wherein the stream of data packets are output from the given media server to a media player associated with a browser executing on an end user machine.

6. A method of fault tolerant delivery of live media content over the Internet, the content being available in a given media format as a stream of data packets from each of a set of multiple delivery sources, comprising:
- at each of a set of server regions, receiving two or more copies of the stream of data packets, with each copy being received from one of the set of multiple delivery sources;
- at each server region, generating a new stream of data packets by discarding redundant data packets, wherein a given data packet is processed within the server region upon its receipt at the server region and, if not discarded, is forwarded upon such processing without delay;
- at each server region, feeding the new stream of data packets to each of a set of media servers associated with the given media format so that each of the set of media servers in the server region is available to provide the stream of data packets;
- within each server region, at each of a set of media servers, receiving the new stream of data packets; and
- in response to each end user request that is directed to one of the set of media servers in the server region that has received the new stream of data packets, outputting the new stream of data packets from a given media server in a server region;
- wherein each stream of data packets is delivered to each server region via UDP and the new stream of data packets is output from the given media server over a media format-specific application layer streaming protocol.

* * * * *